US009254874B2

(12) United States Patent
De Luca et al.

(10) Patent No.: US 9,254,874 B2
(45) Date of Patent: Feb. 9, 2016

(54) REAR FLOOR MODULE OF A MOTOR VEHICLE

(75) Inventors: Fabian De Luca, Luedenscheid (DE); Juergen Hulbert, Eltville (DE); Bjoern Burgard, Moerfelden (DE); Kamil Jerdonek, Frankenthal (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 13/326,782

(22) Filed: Dec. 15, 2011

(65) Prior Publication Data
US 2012/0175914 A1 Jul. 12, 2012

(30) Foreign Application Priority Data

Dec. 16, 2010 (DE) .......................... 10 2010 054 693

(51) Int. Cl.
*B62D 25/08* (2006.01)
*B62D 25/20* (2006.01)
*B60K 15/067* (2006.01)
*B60K 15/07* (2006.01)

(52) U.S. Cl.
CPC .......... *B62D 25/087* (2013.01); *B62D 25/2027* (2013.01); *B60K 15/067* (2013.01); *B60K 15/07* (2013.01)

(58) Field of Classification Search
CPC .... B62D 25/087; B62D 43/10; B62D 25/152; B62D 25/2027; B60K 15/067; B60K 15/07
USPC .................. 296/37.2, 193.04, 193.08, 187.11
See application file for complete search history.

(56) References Cited

U.S. PATENT DOCUMENTS

| 4,531,761 | A | 7/1985 | von Sivers |
| 5,310,212 | A | 5/1994 | Uno et al. |
| 5,364,128 | A | 11/1994 | Ide |
| 5,567,005 | A | 10/1996 | Kosuge et al. |
| 6,540,286 | B2 | 4/2003 | Takemoto et al. |
| 6,666,501 | B1 | 12/2003 | Logan et al. |
| 6,729,682 | B2 | 5/2004 | Delavalle et al. |
| 6,793,261 | B2 * | 9/2004 | McLeod et al. ............. 296/37.2 |

(Continued)

FOREIGN PATENT DOCUMENTS

| DE | 10058016 A1 | 5/2002 |
| DE | 102004007037 A1 | 9/2005 |

(Continued)

OTHER PUBLICATIONS

German Patent Office, German Search Report for Application No. 102010054694.1, dated Jun. 14, 2011.

(Continued)

*Primary Examiner* — Glenn Dayoan
*Assistant Examiner* — Melissa A Black
(74) *Attorney, Agent, or Firm* — Ingrassia Fisher & Lorenz PC

(57) ABSTRACT

A rear floor module of a motor vehicle is provided that is arranged between two rear longitudinal beams of the vehicle body that essentially extend in the longitudinal direction of the vehicle. The floor module features a floor pan that essentially extends in a planar fashion between the longitudinal beams and at least one integrated cross member for separate connection to the longitudinal beams with its end sections that lie in the lateral direction of the vehicle in order to transmit mechanical forces.

18 Claims, 4 Drawing Sheets

(56) References Cited

U.S. PATENT DOCUMENTS

| | | |
|---|---|---|
| 7,111,900 B2 | 9/2006 | Chernoff et al. |
| 7,338,115 B2 | 3/2008 | Rocheblave et al. |
| 7,347,475 B2 | 3/2008 | Ikemoto et al. |
| 8,210,301 B2 | 7/2012 | Hashimoto et al. |
| 2001/0028179 A1 | 10/2001 | Takemoto et al. |
| 2006/0197361 A1 | 9/2006 | Ito et al. |
| 2007/0138836 A1 | 6/2007 | Harney et al. |
| 2008/0277968 A1* | 11/2008 | Egawa et al. ............ 296/193.08 |
| 2009/0058065 A1 | 3/2009 | Park |
| 2009/0102238 A1 | 4/2009 | Gomi |
| 2011/0001337 A1* | 1/2011 | Patschicke et al. ...... 296/193.07 |
| 2011/0156447 A1* | 6/2011 | Matsuoka et al. ....... 296/203.04 |
| 2012/0153674 A1 | 6/2012 | De Luca |

FOREIGN PATENT DOCUMENTS

| | | |
|---|---|---|
| DE | 102005017249 A1 | 5/2006 |
| DE | 60115518 T2 | 7/2006 |
| DE | 102007047037 A1 | 4/2009 |
| EP | 0390752 A1 | 10/1990 |
| EP | 1612127 A2 | 1/2006 |
| EP | 1820716 A1 | 8/2007 |
| EP | 2141064 A1 | 1/2010 |
| GB | 2080211 A | 2/1982 |
| GB | 2287679 A | 9/1995 |
| JP | 2003291856 A | 10/2003 |

OTHER PUBLICATIONS

German Patent Office, German Search Report for Application No. 102010054685.2, dated Jun. 14, 2011.

German Patent Office, German Search Report for Application No. 102010054693.3, dated Jun. 1, 2011.

British Patent Office, British Search Report for Application No. GB1118963.6, dated Feb. 23, 2012.

British Patent Office, British Search Report for Application No. GB1118967.7, dated Feb. 23, 2012.

British Patent Office, British Search Report for Application No. GB1118966.9, dated Feb. 29, 2012.

USPTO, Non-final Office Action issued in U.S. Appl. No. 13/326,512, mailed Nov. 9, 2012.

Response to Office Action for U.S. Appl. No. 13/326,512, dated Jan. 24, 2013.

USPTO, Final Office Action issued in U.S. Appl. No. 13/326,512, mailed Apr. 18, 2013.

USPTO, Office Action for U.S. Appl. No. 13/326,498, mailed Dec. 5, 2013.

USPTO, Response to Office Action for U.S. Appl. No. 13/326,498, mailed Jan. 10, 2014.

* cited by examiner

REAR FLOOR MODULE OF A MOTOR VEHICLE

CROSS-REFERENCE TO RELATED APPLICATION

This application claims priority to German Patent Application No. 102010054693.3, filed Dec. 16, 2010, which is incorporated herein by reference in its entirety.

TECHNICAL FIELD

The technical field relates to a rear floor module for arranged between two longitudinal beams of a vehicle body that essentially extend in the longitudinal direction of the vehicle.

BACKGROUND

Longitudinal beams of a motor vehicle body are typically connected to one another by one or more cross members in the rear region of the vehicle body, e.g., in order to form a closed frame. In this respect, the position of the cross member is varied in the latitudinal direction of the vehicle and adapted to the respective configuration of the motor vehicle or the motor vehicle type. Corresponding modifications of the vehicle body design, particularly with respect to the position of the cross member, may be required depending on whether the motor vehicle needs to be equipped with a trailer hitch or an extendable cargo carrier. This likewise applies a different vehicle types such as, for example, sedans, caravans, station wagons, or limousines.

In order to realize the lowest loading level possible in the trunk region of a vehicle, it is furthermore desirable to arrange the vehicle floor and the bottom trunk lining as low as possible, if applicable even below the level of the longitudinal beams. The cross member needs to be provided at the level of the longitudinal beams for stability reasons and may interfere with the above-described lowering of the cargo floor. In addition, new drive concepts for vehicles, particularly vehicles with hybrid drives or fuel cell drives, require a new layout of the installation space for accommodating the energy storage modules or fuel tanks provided for the respective drive. Particularly in vehicles with hybrid drives or outright electric motor drives, it is desirable to accommodate the required accumulators as low as possible in the vehicle, e.g., in order to improve the position of the center of gravity of the vehicle.

For example, DE 10 2007 047 037 A1 discloses a motor vehicle body with two oppositely arranged rear lateral longitudinal beams, wherein at least one subframe and/or one or more cross members can be assigned to and fixed on the rear lateral longitudinal beams. In this case, the lateral longitudinal beams, the subframe or the cross members are already provided with a number of joints beforehand, wherein these joints are realized and arranged such that one or more correspondingly adapted units and/or attachments can be optionally fixed on the lateral longitudinal beams in the region of the joints in a modular fashion depending on the respectively desired equipment of the motor vehicle rear end.

The design with a plurality of joints, of which only one or a few are actually used for connecting the cross member or the subframe to the lateral longitudinal beams during the final assembly of the motor vehicle body, proves to be complex and cost-intensive with respect to the manufacturing and assembly technology. In addition, the large number of joints provided beforehand increases the vehicle weight.

It is at least one objective to make available a rear cross member of a motor vehicle body that is improved with respect to its weight and installation variability and characterized with respect to its manufacturing and assembly costs, as well as with respect to a reduction of its weight. In this context, at least one aim is to develop a comprehensive vehicle-platform rear cross member structure that can be individually adapted to different vehicle types and equipments. In addition, other objects, desirable features, aims, and characteristics will become apparent from the subsequent summary and detailed description, and the appended claims, taken in conjunction with the accompanying drawings and this background.

SUMMARY

The rear floor module is configured for a motor vehicle body and for being arranged between two rear longitudinal beams of the vehicle body that essentially extend in the longitudinal direction of the vehicle. In this case, the floor module features a floor pan that essentially extends in a planar fashion between the longitudinal beams of the vehicle body and at least one integrated cross member. The cross member integrated into the floor module serves for transmitting mechanical lateral forces and/or mechanical moments. For this purpose, it can be separately connected to the longitudinal beams with its end sections that lie in the lateral direction of the vehicle in the installed state. The floor module, particularly the floor pan, primarily serves as a fairing part in this case and is designed for not being connected to the supporting structural components of the motor vehicle until a relatively late phase of the vehicle assembly process, e.g., during the course of the installation of the vehicle floor or the interior trim.

In this respect, the rear floor module fulfills a double function. Its floor pan primarily acts as a floor or underbody fairing element and fills out the intermediate space between the rear lateral longitudinal beams that essentially extend in the longitudinal direction of the vehicle. The cross member integrated into the floor module, in contrast, acts as a structure-reinforcing component, but is preferably mounted on the vehicle body, preferably on or between the longitudinal beams, together with the floor module due to the integral design of the floor pan and the cross member.

The assembly process can be simplified by providing the rear floor module due to the reduction in the number of components. It is also possible to make the assembly process less error-prone. This is achieved because, when the cross member is mounted on the longitudinal beams, the floor pan also is already in its intended final installation position and vice versa.

According to a first embodiment, it is proposed that the floor pan and/or the cross member are at least sectionally made of plastic. It is preferred that the floor pan and/or the cross member essentially consists of plastic. The utilization of a plastic material for the floor pan and/or for the cross member makes it possible to reduce the overall weight of the vehicle and therefore can contribute to lowering the fuel consumption. The design in the form of a plastic module furthermore makes it possible to flexibly adapt the position of the cross member within the floor module and/or relative to the longitudinal beams. Overall, an assembly concept that is not dependent on the platform and the vehicle type can be made available in this way. Only the floor module needs to be respectively adapted to varying installation space layouts of the vehicle and correspondingly varying positions of the cross member referred to the longitudinal direction of the vehicle.

According to an additional development, it is proposed, in particular, that the floor pan and the cross member are realized in one piece. The floor pan and the cross member are preferably manufactured in the form of an injection molded plastic part. Depending on the specific installation situation, a plurality of differently configured floor modules that are individually adapted to the respective vehicle type or a manufacturing platform can be prefabricated in a plastic injection molding process in this case. The thusly attainable range of different floor modules may vary, for example, with respect to the position of its or their cross members in order to take into consideration the partly different installation conditions of the respective vehicle or vehicle type.

It is furthermore advantageous if the floor pan has a mounting profile that is adapted to the geometry of the assigned longitudinal beam on at least one lateral edge in order to connect the floor pan to at least one of the longitudinal beams. It would be possible, in particular, to provide a mounting profile that protrudes from the lateral edge of the floor pan and comes in contact, for example, with the upper side, the underside, or an inner side wall of the assigned longitudinal beam in order to be connected thereto.

In another embodiment, it is proposed that the cross member preferably protrudes upward from the plane of the floor pan at least in certain areas. In this case, it is proposed that the floor pan features, for example, a depression that lies between the longitudinal beams and is lowered referred to the level of the longitudinal beams while the cross member protrudes upward from the plane of the floor pan and therefore preferably lies at the level or in the plane of the longitudinal beams in order to form a structure-reinforcing frame together with the longitudinal beams.

According to another embodiment, the cross member features at least one plate-like upper part that almost continuously extends over the entire length of the cross member. In this case, it is furthermore preferred that the upper part is connected to a lower part that corresponds to the upper part and/or directly to the floor pan by means of interconnecting webs that are spaced apart from one another in the longitudinal direction of the cross member. Particularly the upper part and the lower part or the region of the floor pan that lies underneath the cross member is made of fiber reinforced or otherwise reinforced plastic, particularly glass fiber reinforced or carbon fiber reinforced plastic, in order to absorb and, if applicable, divert lateral forces and moments that may act upon the cross member. Thermoplastic elastomers, particularly those based on polypropylene (PP) or polyamide (PA), may be considered as preferred plastic materials.

According to an additional embodiment, it is furthermore proposed that structure-reinforcing ribs are formed between the interconnecting webs and between the upper and the lower part or between the upper part and the floor pan, respectively. These ribs may extend parallel or perpendicular, but also in a crosswise, lattice-like or hexagonal structure, referred to the longitudinal direction of the upper part of the cross member. The interconnecting webs are realized in the form of solid components that preferably feature essentially no cavities. They may have, e.g., a cuboid or block-like shape.

According to another embodiment, it is advantageous if at least one metal insert designed for receiving a connecting means is embedded at least in the outer cuboid interconnecting webs provided on the free ends of the cross member, in the lateral mounting edge of the floor pan and/or in intersecting points of structure-reinforcing ribs. Such metal inserts make it possible to connect, in particular, the cross member to the lateral longitudinal beams in a solid and stable fashion. In this context, it is advantageous if the metal insert embedded in at least one interconnecting web or in an edge region of the cross member that borders on the lateral longitudinal beams is realized in the form of a sleeve that completely penetrates the respective connecting web and is provided for receiving a mounting means such as, e.g., a screw-type fastener, particularly a stud. The ends of the cross member that lie in the lateral direction of the vehicle preferably can be positively connected and/or screwed to the lateral longitudinal beams, for example, by means of a mounting shoe of metal, preferably of sheet steel, that is realized in the form of a U-profile in certain areas.

According to another embodiment, it is furthermore proposed that the free ends of the cross member that lie in the lateral direction of the vehicle are tapered relative to a central section in the installation position on the vehicle. The central section of the cross member needs to be realized somewhat thicker and more stable than its longitudinal ends in order to take into account the fact that the bending moment increases toward the center of the cross member when a load occurs.

According to another embodiment, it is furthermore proposed that the floor pan of the rear floor module features at least one depression for accommodating vehicle components and functional devices, e.g., for accommodating a spare tire and/or a battery and/or at least one fuel tank, for example, a mineral oil tank or liquefied gas tank. A depression in the form of a receptacle for accumulators may be provided in the region of the floor pan, in particular, in motor vehicles with a hybrid drive or an outright electric motor drive. The floor pan may be divided into two preferably coherent sections, for example, by the cross member situated above the pan level. It would be possible, for example, to realize a division, in which the receptacle for one or more batteries or accumulators is arranged in front of the cross member and a spare tire recess is arranged behind the cross member referred to the driving direction.

The arrangement of the cross member, as well as its geometric design and dimensions, preferably aim at an optimization of the existing installation space. Depending on whether and to what extent the motor vehicle needs to be provided with a spare tire, accumulators, batteries and fuel tanks or other functional components such as, e.g., an extendable cargo carrier at the rear end, the position of the cross member can be adapted in the longitudinal direction of the vehicle by providing a rear floor module of plastic that respectively is individually adapted to the installation requirements. A respective adaptation of the actual vehicle body and the longitudinal beams is no longer required in this respect.

According to another embodiment, a motor vehicle is provided with a vehicle body that features at least two rear longitudinal beams and a floor module arranged between the longitudinal beams. A cross member extends between the longitudinal beams and is integrated into the floor module, and the cross member is separately connected to the respective longitudinal beams with its opposite end sections. As already described above, the floor module not only features the integrated cross member in this case, but also a floor pan that preferably forms a largely complete fairing and accordingly fills out the region between the longitudinal beams and, referred to the longitudinal direction of the vehicle, the region between a heel plate and a rear end plate.

According to an additional embodiment, it is proposed, in particular, that the free end sections of the cross member are inserted into a mounting shoe in the form of a U-profile that is adapted to the cross section of the respective cross member and positively and/or non-positively mounted on the respective longitudinal beam. In this case, the mounting shoe may, for example, be welded or screwed to the respective longitudinal beams. A screw connection between the cross member and the mounting shoe is provided, in particular, on the side of the cross member. In this respect, the receptacle of the mounting shoe in the form of a U-profile features through-openings that are aligned with one another and, once the final installation position of the floor module is reached, with the mounting means embedded in the plastic cross member on the module side. If metal sleeves penetrate the cross member in the longitudinal direction of the vehicle, the through-openings provided on the mounting shoe make it possible to produce a corresponding screw connection between the cross member and the mounting shoe by means of a stud.

BRIEF DESCRIPTION OF THE FIGURES

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
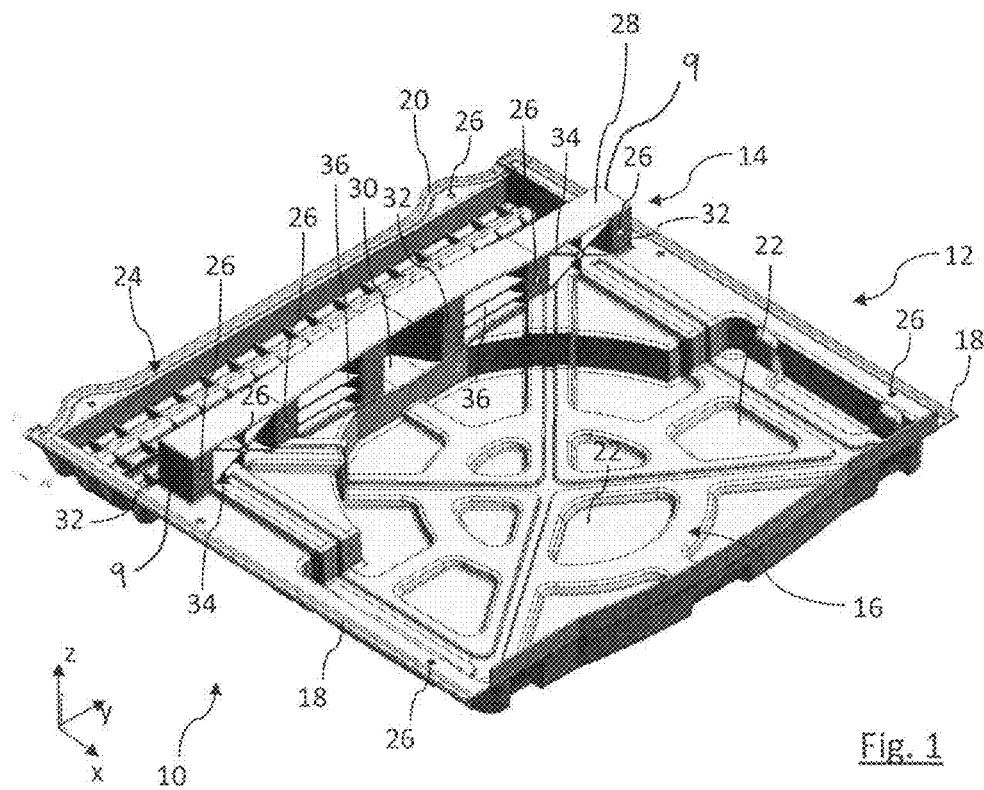
FIG. 1 shows an isolated perspective representation of one possible embodiment of a rear floor module provided with a cross member.
Figure 2:
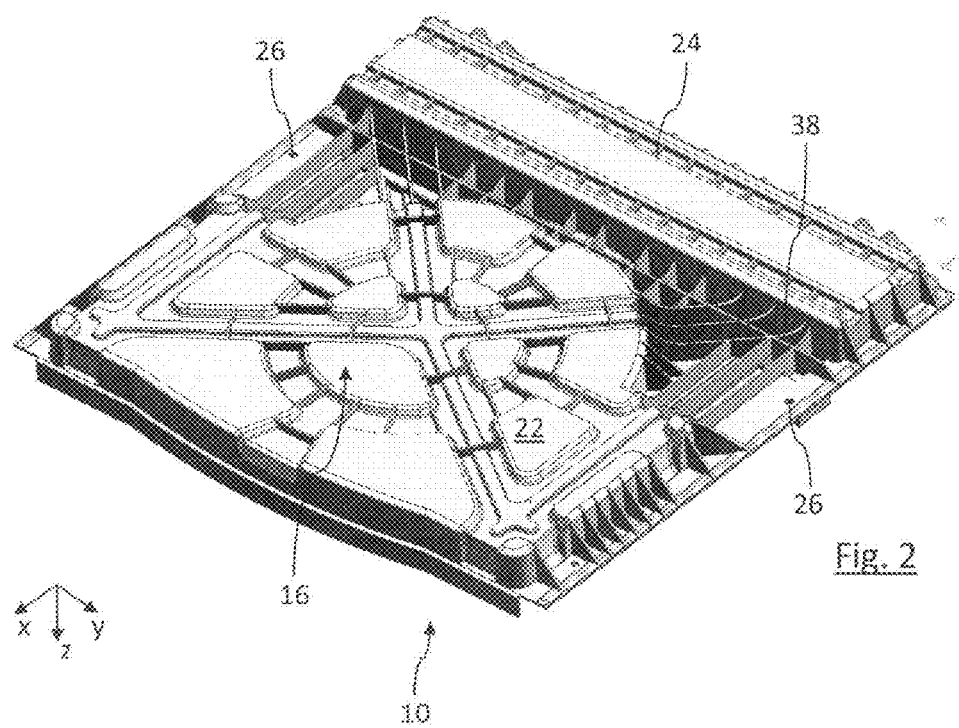
FIG. 2 shows a bottom view of the floor module according to FIG. 1.

The rear floor module 10 illustrated in an isolated and perspective fashion from different views in FIG. 1 and FIG. 2 features a cross member 14 that essentially extends in the lateral direction (y) of the vehicle with two free ends 9 that face in the opposite lateral directions (y), as well as a floor pan 12 that is realized in one piece with the cross member. The floor pan 12 is realized in the form of an essentially rectangular planar structure, namely an approximately square planar structure in the exemplary embodiment shown. This planar structure can be mounted on the lateral longitudinal beams 46 of the vehicle body shown in FIG. 3 by means of edge profiles that lie in the lateral direction (y) of the vehicle and contain through-openings 26 that, in turn, are preferably provided with metal inserts. A spare tire recess 16 in the form of a depression extends downward from the plane of the floor pan 12 and is provided with pocket-like depressions 22 in order to increase the overall rigidity.

In the opposite direction, the cross member 14 rises from the plane of the largely planar floor pan 12. According to FIG. 1, the cross member 14 has a panel-like or plate-like upper part 28 that is essentially realized continuously in the lateral direction (y) of the vehicle and connected to the floor pan 12 and/or to a preferably structure-reinforcing lower part 30 embedded in the floor pan 12 by means of cuboid interconnecting webs 32. It is preferred that the cross member 14, its upper part 28 and lower part 30, as well as the floor pan 12, essentially are entirely made of plastic. In this respect, the entire floor module 10 is realized, in particular, in the form of an injection molded plastic part. In comparison with a cross member 14 of steel or metal, this can contribute to minimizing the weight of the vehicle.

Various reinforcing structures such as, for example, a honeycomb structure 34 with intersecting reinforcing ribs or a horizontally aligned lamellar structure 36 extend between the cuboid interconnecting webs 32. The reinforcing structures 34, 36 contribute to the stability and the structural rigidity of the cross member 14 and furthermore serve for minimizing the weight. Comparable reinforcing ribs 38 are illustrated, for example, on the underside of the floor module 10 in FIG. 2. The design and the geometric shape of the various reinforcing elements 34, 36, 38 preferably are realized for achieving the maximum rigidity and stability with the lowest possible weight.

Figure 6:
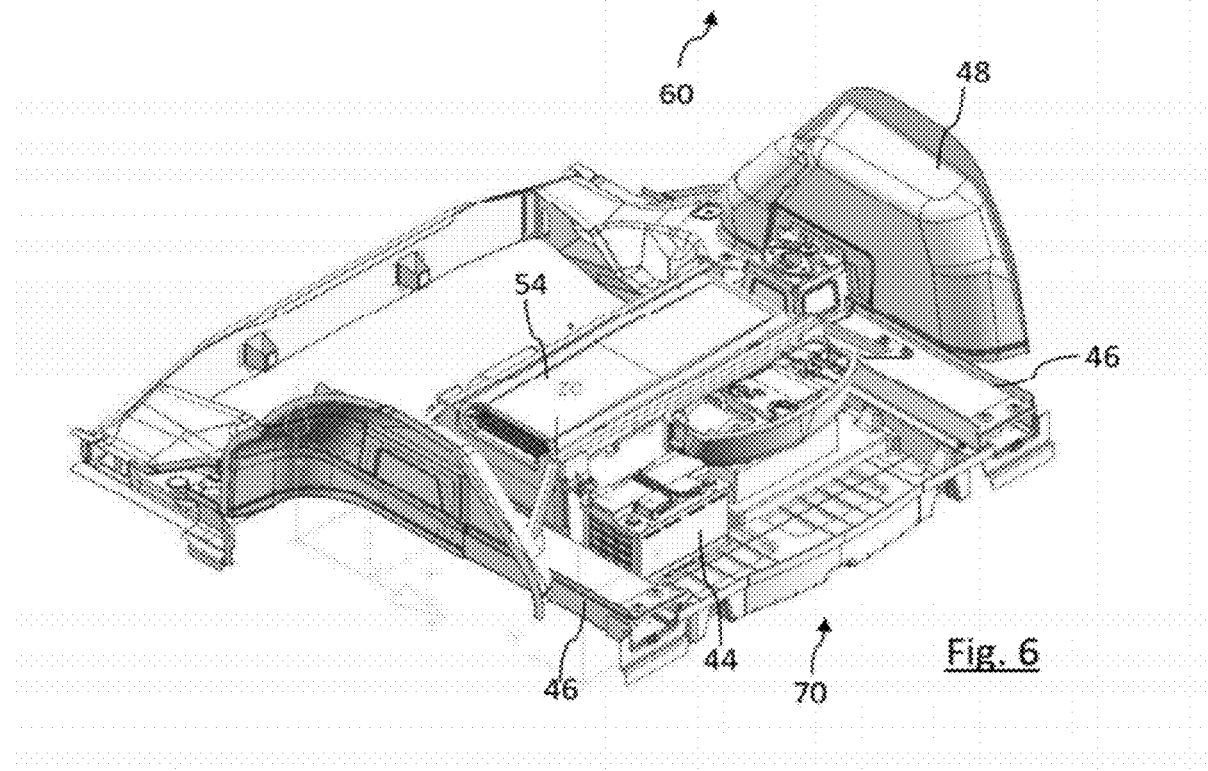
FIG. 6 shows another embodiment of a floor module fitted with an accumulator.

The plastic injection molding process proposed for manufacturing the floor module 10 makes it possible to create nearly arbitrary geometric structures with comparatively low costs, but primarily with a low manufacturing effort. The side of the cross member 14 that faces away from the spare tire recess 16 is furthermore provided with a receptacle depression 24 that is approximately realized continuously in the lateral direction of the vehicle and also provided with individual cross-like reinforcing ribs that extend in the longitudinal and the lateral direction of the vehicle. For example, an accumulator 54 that is illustrated in FIG. 6 and used, for example, for a hybrid drive or an electric drive can be inserted into and fixed on the receptacle depression 24.

A mounting flange with two mounting brackets 20 that protrude forward in the driving direction borders on said receptacle depression 24 in the forward direction, i.e., in the driving direction. For example, mounting means 26 of metal such as, e.g., metal sleeves or nuts are embedded in the brackets 20 that protrude from the floor pan 12. The mounting brackets 20 may furthermore serve, for example, for mounting the floor pan or the entire floor module on the seat cross member or a heel plate of a motor vehicle.

Mounting elements 26 of metal are also embedded in the interconnecting webs 32 of the cross member 14. The mounting elements 26 advantageously feature a metal sleeve that penetrates the interconnecting web in the longitudinal direction (x) of the vehicle. In the installation position illustrated in FIG. 3, for example, the lateral edge of the floor pan 12 is screwed to the longitudinal beam structure 46 in the region of the mounting points 26 with one or more mounting screws 19.

Separate connecting shoes 40 are provided for the cross member 14 lying in the plane of an inside surface 8 of the longitudinal beams 46 that are spaced apart from one another in the lateral direction (y) of the vehicle. The connecting shoes are, for example, welded or screwed to the longitudinal beams 46 and have a downwardly open U-profile that is placed on and therefore accommodate the upper part 28 of the cross member 14, and the through-openings in the lateral limbs of the connecting shoes 40 are preferably aligned with the metal sleeves 26 embedded in the interconnecting webs 32 of the cross member 14. Consequently, one or more studs 42 can be screwed through the at least two outer interconnecting webs 32 and through the limbs of the connecting shoe 40.

FIG. 1 furthermore shows that the central intersecting point of the honeycomb-like rib structure 34 realized between the two outer interconnecting webs 32 is provided with a metal sleeve 26 that serves for accommodating a corresponding mounting bolt 42. In the illustration according to FIG. 3, a storage battery 44 is furthermore arranged in front of the cross member 14 referred to the driving direction, namely in the front receptacle depression 24. The position of the cross member 14 may vary depending on the design of a spare tire recess 16 or depending on the dimensions of other vehicle components to be arranged at or on the floor pan 12. Since the floor module 10 preferably is not installed until the car body shell is finished, namely during the installation of the floor trim into the vehicle, no separate mounting points or joints need to be provided on the side of the longitudinal beams. In order to mount the cross member 14, it is merely required to hold available two connecting shoes 40 that are provided on the respective ends of the cross member 14 and preferably are always mounted on the cross member 46 in the form of an identical design regardless of the installation position of the cross member 14.

Figure 3:
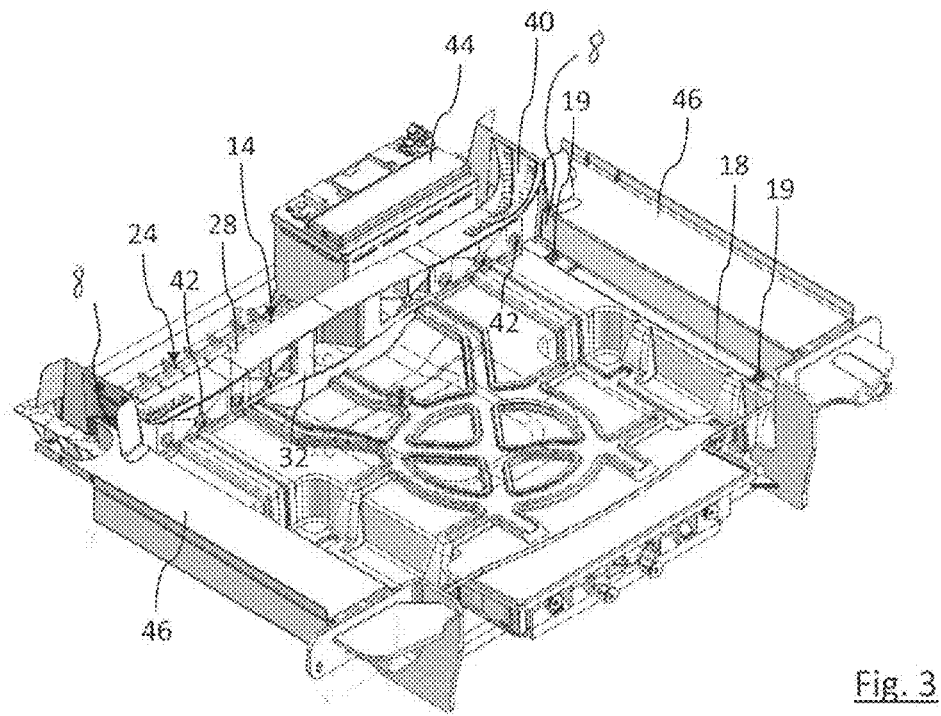
FIG. 3 shows a floor module in the installation position on the longitudinal beams of a vehicle body.
Figure 4:
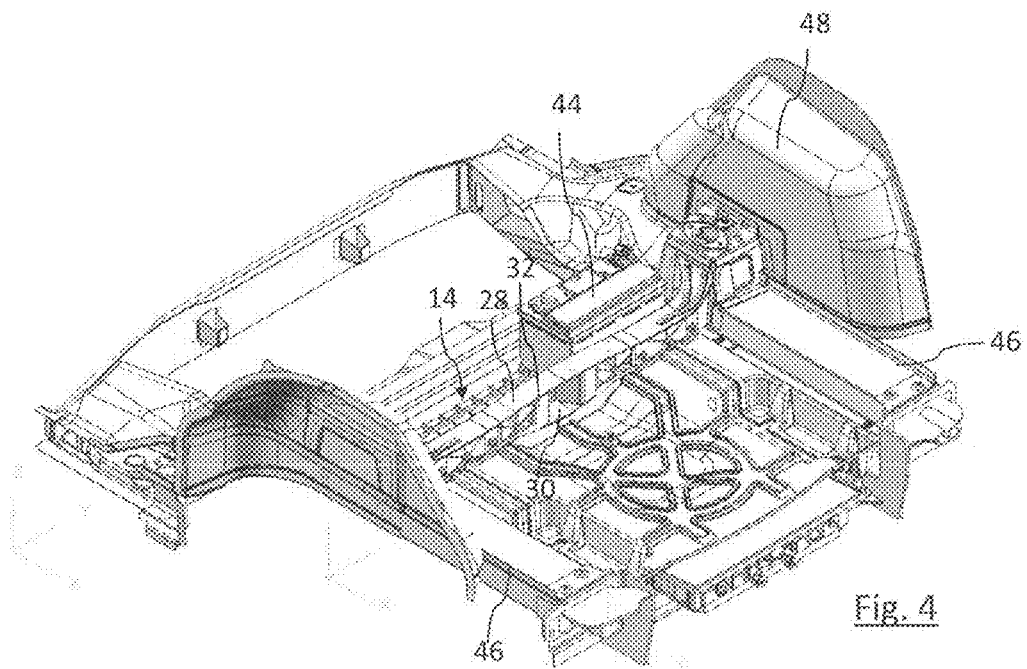
FIG. 4 shows the installation situation according to FIG. 3, in which additional vehicle body components are illustrated.
Figure 5:
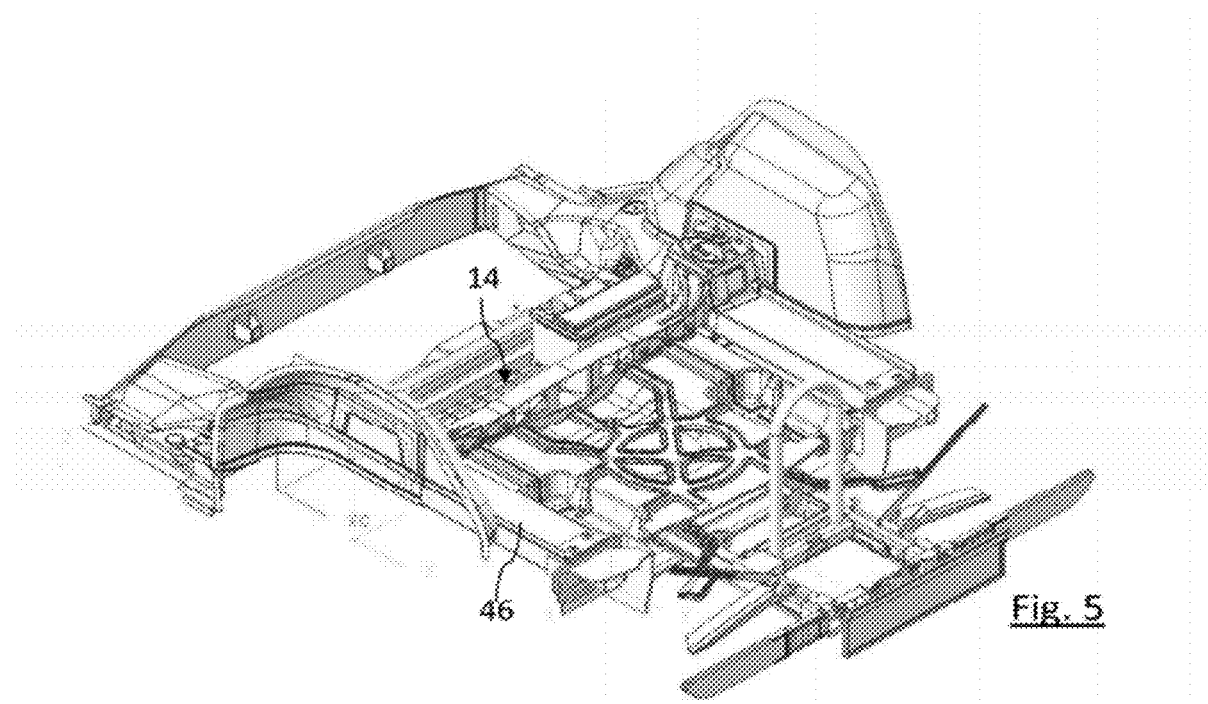
FIG. 5 shows the embodiment according to FIG. 3 and FIG. 4 with a rear load carrier that is provided on the floor module and illustrated in the extended position.

As an additional development of the illustration according to FIG. 3, FIG. 4 shows other vehicle body components such as, for example, two wheel arches 48. FIG. 5 shows another configuration of the floor module according to FIG. 3 and FIG. 4. In this case, an extendable cargo carrier 60, e.g., in the form of a bicycle/luggage rack is illustrated on the floor module and, if applicable, separately connected to at least one of the longitudinal beams 46. In this respect, the floor module may feature mounting points or structure-reinforcing parts that are especially preconfigured for the extendable cargo carrier 60 such as, for example, metal inserts that serve for accommodating the extendable rails of the cargo carrier 60.

In comparison with the embodiments illustrated in FIG. 1 to FIG. 5, the floor module 70 according to FIG. 6 has a modified interior structure, but can be connected to an always identical longitudinal beam structure 46. The cross member integrated into the module 70 is not separately illustrated in this figure. It extends, for example, underneath the accumulator 54 that largely extends over the entire floor module 10 in the lateral direction and is preferably provided as an energy storage device for a hybrid drive or an electric drive, respectively. The storage battery 44 is arranged behind the accumulator 54 in this case. In contrast to the embodiment according to FIG. 1 and FIG. 2, a spare tire recess is not provided in the floor module 70 illustrated in FIG. 6.

Figure 7:
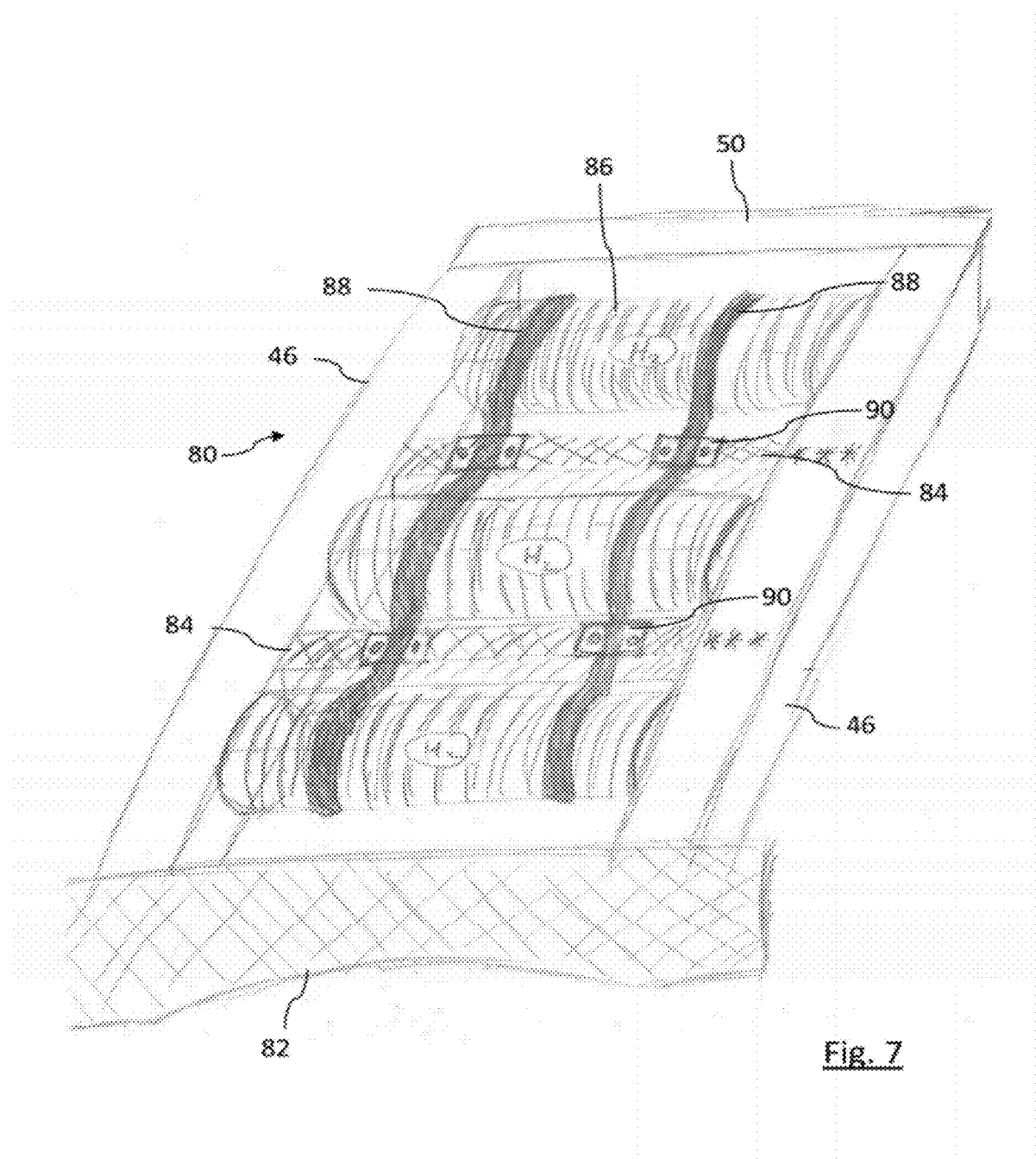
FIG. 7 shows a schematic representation of another floor module with two integrated cross members for accommodating several liquefied gas tanks.

FIG. 7 shows a conceptual representation of another conceivable embodiment of a floor module 80, the floor pan of which is not explicitly illustrated, but preferably realized in one piece with two cross members 84 that are spaced apart from one another in the longitudinal direction of the vehicle and essentially extend straight between the lateral longitudinal beams 46. The intermediate spaces formed between the lateral longitudinal beams 46, as well as between the seat cross member 50, the floor module cross members 84 and a rear end plate 82 serve for accommodating fuel tanks 86 that consist of liquefied gas tanks in the example shown. In this case, the fuel tanks 86 are fixed in position by means of fixing straps 88 that extend in the longitudinal direction of the vehicle and are connected to the two cross members 84 with the aid of holding plates.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A preconfigured rear floor module of a motor vehicle to be arranged between two rear longitudinal beams of a vehicle body during final assembly stages of the motor vehicle that essentially extend in a longitudinal direction of the motor vehicle, comprising:
    a floor pan that essentially extends in a planar fashion between the two rear longitudinal beams;
    an integrated cross member formed in a forward portion of the floor pan, protruding upward from the plane of the floor pan and having free ends, each free end facing in a lateral direction of the motor vehicle; and
    a connecting shoe provided at each free end of the cross member, each connecting shoe having a profile accommodating an upper part of the cross member and secured to one of the two rear longitudinal beam to transmit lateral mechanical forces from the cross member to the two rear longitudinal beams.

2. The rear floor module according to claim 1, wherein the floor pan is at least made of plastic in certain areas.

3. The rear floor module according to claim 1, wherein the integrated cross member is at least made of plastic in certain areas.

4. The rear floor module according to claim 1, wherein the floor pan and the integrated cross member are a single part of injection molded plastic.

5. The rear floor module according to claim 1, wherein the floor pan comprises a mounting profile that is adapted to a geometry of at least one of the two rear longitudinal beams on a lateral edge in order to connect the floor pan to at least one of the two rear longitudinal beams.

6. The rear floor module according to claim 1, wherein the integrated cross member is configured to protrude from a plane of the floor pan at least in certain areas.

7. The rear floor module according to claim 1, wherein the integrated cross member comprises a plate-like upper part that almost extends over an entire length of the integrated cross member and connected to a lower part that corresponds to the plate-like upper part with interconnecting webs that are spaced apart from one another in the longitudinal direction of the integrated cross member.

8. The rear floor module according to claim 7, wherein structure-reinforcing ribs are formed between the interconnecting webs.

9. The rear floor module according to claim 7, wherein a metal insert is configured to receive a connector embedded at least in the interconnecting webs provided on the free ends of the integrated cross member in a lateral mounting edge of the floor pan.

10. The rear floor module according to claim 9, wherein the metal insert is embedded in at least one interconnecting web formed as a sleeve that penetrates the respective connecting web and configured to receive a stud.

11. The rear floor module according to claim 1, wherein the integrated cross member is tapered relative to a central section toward the free ends.

12. The rear floor module according to claim 1, wherein the floor pan comprises a depression configured to accommodate a vehicle component.

13. The rear floor module according to claim 12, wherein the vehicle component is a spare tire.

14. The rear floor module according to claim 1, wherein a position of the integrated cross member is configured to vary installation situations in the motor vehicle in the longitudinal direction of the motor vehicle for optimization of an installation space layout.

15. A motor vehicle, comprising:
a vehicle body;
two rear longitudinal beams each with an internal side; and
a preconfigured floor module to be arranged between the two rear longitudinal beams during final assembly stages of the vehicle body, the floor module comprising:
a floor pan that essentially extends in a planar fashion between the two rear longitudinal beams;
an integrated cross member formed in a forward portion of the floor pan, protruding upward from the plane of the floor pan and connected to the internal sides of two rear longitudinal beams, the integrated cross member having two opposite free end sections that face in a lateral direction of the motor vehicle; and
a connecting shoe provided at each free end of the cross member, each connecting shoe having a profile accommodating an upper part of the cross member and secured to one of the two rear longitudinal beam configured to transmit mechanical forces from the cross member to the longitudinal beam.

16. The motor vehicle according to claim 15, wherein each of the connecting shoes comprises a metal mounting shoe with a U-profile, each metal mounting shoe coupling the lateral facing free end sections of the integrated cross member to the internal side of one of the longitudinal beams.

17. The rear floor module according to claim 1, wherein the lateral facing free ends are coupled to internal sides of the rear longitudinal beams.

18. The rear floor module according to claim 17, wherein the free ends are coupled to the internal sides of the rear longitudinal beams via a metal mounting shoe with a U-profile.

\* \* \* \* \*